(12) United States Patent
Hao et al.

(10) Patent No.: US 8,565,351 B2
(45) Date of Patent: Oct. 22, 2013

(54) CHANNEL IMPULSE RESPONSE (CIR)/DC OFFSET (DCO) JOINT ESTIMATION BLOCK AND METHOD

(75) Inventors: Yonggang Hao, Waltham, MA (US); Carsten Aagaard Pedersen, Cambridge, MA (US); Aiguo Yan, Andover, MA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 159 days.

(21) Appl. No.: 13/095,928

(22) Filed: Apr. 28, 2011

(65) Prior Publication Data

US 2012/0275472 A1   Nov. 1, 2012

(51) Int. Cl.
*H04L 25/06* (2006.01)
(52) U.S. Cl.
CPC .................................. *H04L 25/061* (2013.01)
USPC ....................................................... 375/319
(58) Field of Classification Search
CPC ................................................... H04L 25/061
USPC ....................................................... 375/319
See application file for complete search history.

(56) References Cited

U.S. PATENT DOCUMENTS

| | | | | |
|---|---|---|---|---|
| 5,487,069 A * | 1/1996 | O'Sullivan et al. | ........... | 370/404 |
| 6,173,011 B1 * | 1/2001 | Rey et al. | ...................... | 375/233 |
| 6,370,205 B1 * | 4/2002 | Lindoff et al. | ................. | 375/319 |
| 6,504,884 B1 * | 1/2003 | Zvonar | .......................... | 375/346 |
| 6,542,560 B1 * | 4/2003 | Buehrer et al. | ................. | 375/346 |
| 2005/0084039 A1 * | 4/2005 | Kocic et al. | ................... | 375/319 |
| 2005/0204208 A1 * | 9/2005 | Kocic et al. | ................... | 714/700 |
| 2012/0275472 A1 * | 11/2012 | Hao et al. | ...................... | 370/479 |

\* cited by examiner

*Primary Examiner* — Ricky Ngo
*Assistant Examiner* — Phuongchau B Nguyen
(74) *Attorney, Agent, or Firm* — Winston Hsu; Scott Margo

(57) ABSTRACT

A channel impulse response (CIR)/DC offset (DCO) joint estimation for a time division synchronous code division multiple access (TDSCDMA) system includes generating from a basic midamble and received midamble an initial estimation of the CIR as a series of CIR taps; storing the initially estimated CIR taps; calculating a DC compensated CIR from the initially estimated CIR taps; filtering out the noise from the DC compensated CIR to produce the CIR estimation; and calculating the DC offset estimation from the CIR estimation.

26 Claims, 5 Drawing Sheets

CHANNEL IMPULSE RESPONSE (CIR)/DC OFFSET (DCO) JOINT ESTIMATION BLOCK AND METHOD

FIELD OF THE INVENTION

This invention relates to channel impulse response (CIR)/DC offset (DCO) joint estimation block and method and to a time division synchronous code division multiple-access (TDSCDMA) system using the same.

BACKGROUND OF THE INVENTION

Direct current (DC) offset estimation is carried out over each time slot (burst) in a time division synchronous code division multiple-access (TDSCDMA) system. The time slot consists of four portions: two data fields, one midamble field and a guard period (GD). The data fields have 352 chips each, the midamble 144 chips and the GP 16 chips. A chip is a symbol which has been already modulated for transmission. The conventional DC offset estimation method processes the data fields and estimates the DC offset by averaging the data symbols or chips. The data symbols or chips (from two data fields) in each burst are fed to a DC offset block to generate DC offset estimation which is used to compensate the whole burst. The compensated midamble is then passed to a channel estimation block to generate channel impulse response (CIR) estimation. Finally, both CIR estimation and compensated data are forwarded to a joint detector (JD). This approach works well statistically when there are many, many chips per field but not so well in TDSCDMA receivers where the data fields are 704 chips. In that case the accuracy is not as good as desired.

SUMMARY OF THE INVENTION

It is therefore an object of this invention to provide an improved channel impulse response (CIR)/DC offset (DCO) joint estimation block and method.

It is a further object of this invention to provide such an improved channel impulse response (CIR)/DC offset (DCO) joint estimation block and method particularly applicable to TDSCDMA receivers.

It is a further object of this invention to provide such an improved CIR/DCO joint estimation block and method which is more accurate even with smaller data fields having fewer chips.

It is a further object of this invention to provide such an improved CIR/DCO joint estimation block and method which does not require significant additional hardware or cycle time.

It is a further object of this invention to provide such an improved CIR/DCO joint estimation block and method which is compatible with existing equipment and protocols.

It is a further object of this invention to provide such an improved CIR/DCO joint estimation block and method which requires only a limited number of additional addition/multiplication/division/subtraction operations.

It is a further object of this invention to provide such an improved CIR/DCO joint estimation block and method which can apply a recursive, reiterative approach to solve an under determined problem.

The invention results from the realization that an improved more accurate CIR/DCO joint estimation approach is achieved by generating an initial estimation of the CIR as a series of taps from a basic and received midamble, each having a plurality of chips, storing the initially estimated CIR, calculating DC compensated CIR from the initially estimated CIR taps, filtering out noise from the compensated CIR to produce the CIR estimation and calculating the DC offset estimation from the CIR estimation; and that such an approach is compatible with a TDSCDMA receiver.

The subject invention, however, in other embodiments, need not achieve all these objectives and the claims hereof should not be limited to structures or methods capable of achieving these objectives.

This invention features a channel impulse response (CIR)/DC offset (DCO) joint estimation block including an estimation CIR circuit responsive to a basic and a received midamble, each having a plurality of chips to provide an initial estimation of the CIR as a series of CIR taps; a DC offset compensation circuit responsive to the estimated series of CIR taps to produce a DC compensated CIR; a noise refinement circuit receiving the DC compensated CIR, filtering out the taps of a series of CIR taps below a predetermined noise level and passing the CIR estimation; and a DC offset estimation circuit responsive to the CIR estimation to provide a DC offset estimation.

In preferred embodiments there may be further included an iterative feedback circuit connected from the DC offset estimation circuit to the DC offset compensation circuit for updating the compensation of the DC compensated CIR and improving the accuracy of the CIR estimation and the DC offset estimation. The estimation CIR circuit may be adapted for use in TDSCDMA receiver and may include a fast Fourier transform (FFT) circuit responsive to each of the midambles, a dot division circuit responsive to the FFT circuit outputs to divide the received midamble by the basic midamble to provide chip by chip and an inverse FFT responsive to the dot division circuit to provide to a buffer the initial estimation of the CIR as a series of CIR taps. The CIR/DCO joint estimation block may be implemented in digital circuitry.

This invention also features a channel impulse response (CIR)/DC offset (DCO) joint estimation block including a processor configured to generate from a basic midamble and received midamble an initial estimation of the CIR as a series of CIR taps; calculate DC compensated CIR from the estimated CIR taps; filter out the noise from the DC compensated CIR to produce the CIR estimation; and calculate the DC offset estimation from the CIR estimation.

In preferred embodiments the processor may be further configured to apply the DC offset estimation to the calculation of the DC compensated CIR to improve the accuracy of the CIR estimation and the DC offset estimation. Each midamble may include a plurality of chips and the processor may be adapted for use in a TDSCDMA receiver and may be further configured to generate from the basic and received midamble an estimation of the CIR as a series of CIR taps by performing a fast Fourier transfer (FFT) of each midamble, dot dividing the received midamble by the basic midamble chip by chip and performing an inverse FFT of the result to provide the initial estimation of the CIR as a series of CIR taps. The CIR/DCO joint estimation may be implemented in digital circuitry.

This invention also features a method of channel impulse response (CIR)/DC offset (DCO) joint estimation for a time division synchronous code division multiple-access (TDSCDMA) system including the following steps generating from a basic midamble and received midamble an initial estimation of the CIR as a series of CIR taps; storing the initially estimated CIR taps; calculating DC compensated CIR from the initially estimated CIR taps; filtering out the noise from the DC compensated CIR to produce the CIR estimation; and calculating the DC offset estimation from the CIR estimation.

In preferred embodiments there may be further included iterative feedback of the DC offset estimation to the calculating of the DC compensated CIR to improve the accuracy of the CIR estimation and the DC offset estimation. Each midamble may include a plurality of chips and generating from the basic and received midamble an initial estimation of the CIR as a series of taps including performing a fast Fourier transfer (FFT) of each midamble, dot dividing the received midamble by the basic midamble chip by chip and performing an inverse FFT of the result to provide the initial estimation of the CIR as a series of CIR taps. Generating an initial estimation of the CIR may include calculating $R_{mid}=\text{FFT}(r_{mid})$, $M=\text{FFT}(m)$, $\tilde{H}(i)=R_{mid}(i)/M(i)$, $\tilde{h}=\text{IFFT}(\tilde{H})$. The stored initial CIR estimation $\tilde{h}$ may be applied to calculate the DC compensated CIR from the initially estimated CIR taps according to $$\overline{h}^{(k)}(j) = \tilde{h}(j) - \frac{\hat{D}^{(k)}}{\sum m(i)};$$

where k is the iteration index, starting from 0; $\hat{D}^{(k)}$ is the DCO estimation at $k^{th}$ iteration; the initial value of DC estimation, $\hat{D}^{(0)}$, is $$\frac{1}{128}R_{mid}(0)$$

and $\Sigma m(i)=M(0)$. Noise may be filtered out from the compensated CIR to produce the CIR estimation according to:

$$\hat{h}^{(k)} = \text{refine}(\overline{h}^{(k)})$$

$$\hat{h}^{(k)}(i) = \begin{cases} \overline{h}^{(k)}(i), & \text{if } |\overline{h}^{(k)}(i)| \text{ is larger than predetermined threshold.} \\ 0, & \end{cases}$$

The DC offset estimation may be calculated from the CIR estimation according to:

$$\hat{D}^{(k+1)} = \frac{1}{128}\sum_{i}^{128} r_{mid}(i) - \frac{\sum_{i=0}^{128} \hat{h}^{(k)}(i) \sum_{i=0}^{128} m(i)}{128}.$$

The receiver may be a TDSCDMA receiver. The method may be implemented in digital circuitry.

The invention also features a TDSCDMA receiver including a channel impulse response (CIR)/DC offset (DCO) joint estimation block including an interface to collect midamble $r_{mid}$; an initial estimation CIR circuit responsive to a basic midamble $r_{mid}$ and a received midamble m, each having a plurality of chips to provide an initial estimation of the CIR as a series of CIR taps $\tilde{h}$; a buffer for storing the initially estimated series of CIR taps $\tilde{h}$; a DC offset compensation circuit responsive to the initially estimated series of CIR taps to produce a DC compensated CIR $\overline{h}(i)$; a noise refinement circuit for filtering out the taps of a series of CIR taps below a predetermined noise level and passing the CIR estimation $\hat{h}$; and a DC offset estimation circuit responsive to the CIR estimation to provide a DC offset estimation $\hat{D}$.

In preferred embodiments there may be further included an iterative feedback circuit connected from the DC offset estimation circuit to the DC offset compensation circuit for updating the compensation of the DC compensated CIR and improving the accuracy of the CIR estimation and the DC offset estimation. The CIR/DCO joint estimation circuit may generate an initial estimation of the CIR including calculating $R_{mid}=\text{FFT}(r_{mid})$, $M=\text{FFT}(m)$, $\tilde{H}(i)=R_{mid}(i)/M(i)$, $\tilde{h}=\text{IFFT}(\tilde{H})$. The stored initial CIR estimation $\tilde{h}$ may be applied to calculate the DC compensated CIR from the initially estimated CIR taps according to $$\overline{h}^{(k)}(j) = \tilde{h}(j) - \frac{\hat{D}^{(k)}}{\sum m(i)};$$

where k is the iteration index, starting from 0; $\hat{D}^{(k)}$ is the DCO estimation at $k^{th}$ iteration; the initial value of DC estimation, $\hat{D}^{(0)}$, is $$\frac{1}{128}R_{mid}(0)$$

and $\Sigma m(i)=M(0)$. Noise may be filtered out from the compensated CIR to produce the CIR estimation according to:

$$\hat{h}^{(k)} = \text{refine}(\overline{h}^{(k)})$$

$$\hat{h}^{(k)}(i) = \begin{cases} \overline{h}^{(k)}(i), & \text{if } |\overline{h}^{(k)}(i)| \text{ is larger than predetermined threshold.} \\ 0, & \end{cases}$$

The DC offset estimation may be calculated from the CIR estimation according to:

$$\hat{D}^{(k+1)} = \frac{1}{128}\sum_{i}^{128} r_{mid}(i) - \frac{\sum_{i=0}^{128} \hat{h}^{(k)}(i) \sum_{i=0}^{128} m(i)}{128}.$$

The estimation CIR circuit may be implemented in digital circuitry.

This invention also features a time division synchronous code division multiple access (TDSCDMA) receiver including a channel impulse response (CIR)/DC offset (DCO) joint estimation block including a processor configured to generate from a basic midamble and received midamble an initial estimation of the CIR as a series of CIR taps; store the initially estimated CIR taps; calculate a DC compensated CIR from the initially estimated CIR taps; filter out the noise from the DC compensated CIR to produce the CIR estimation; calculate the DC offset estimation from the CIR estimation; and an iterative feedback loop connected from the DC offset estimation circuit to the DC offset compensation circuit for updating the compensation of the DC compensated CIR and improving the accuracy of the CIR estimation and the DC offset estimation.

In preferred embodiments generating an initial estimation of the CIR may include calculating $R_{mid}=\text{FFT}(r_{mid})$, $M=\text{FFT}(m)$, $\tilde{H}(i)=R_{mid}(i)/M(i)$, $\tilde{h}=\text{IFFT}(\tilde{H})$. The stored initial CIR estimation $\tilde{h}$ may be applied to calculate the DC compensated CIR from the initially estimated CIR taps according to $$\overline{h}^{(k)}(j) = \tilde{h}(j) - \frac{\hat{D}^{(k)}}{\sum m(i)};$$

where k is the iteration index, starting from 0; $\hat{D}^{(k)}$ is the DCO estimation at $k^{th}$ iteration; the initial value of DC estimation, $\hat{D}^{(0)}$, is $$\frac{1}{128} R_{mid}(0)$$

and $\Sigma m(i) = M(0)$. Noise may be filtered out from the DC compensated CIR to produce the CIR estimation according to:

$$\hat{h}^{(k)} = \text{refine}(\overline{h}^{(k)})$$

$$\hat{h}^{(k)}(i) = \begin{cases} \overline{h}^{(k)}(i), & \text{if } |\overline{h}^{(k)}(i)| \text{ is larger than predetermined threshold} \\ 0, \end{cases}$$

The DC offset estimation may be calculated from the CIR estimation according to:

$$\hat{D}^{(k+1)} = \frac{1}{128} \sum_{i}^{128} r_{mid}(i) - \frac{\sum_{i=0}^{128} \hat{h}^{(k)}(i) \sum_{i=0}^{128} m(i)}{128}.$$

The TDSCDMA receiver may be implemented in its entirety in digital circuitry.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
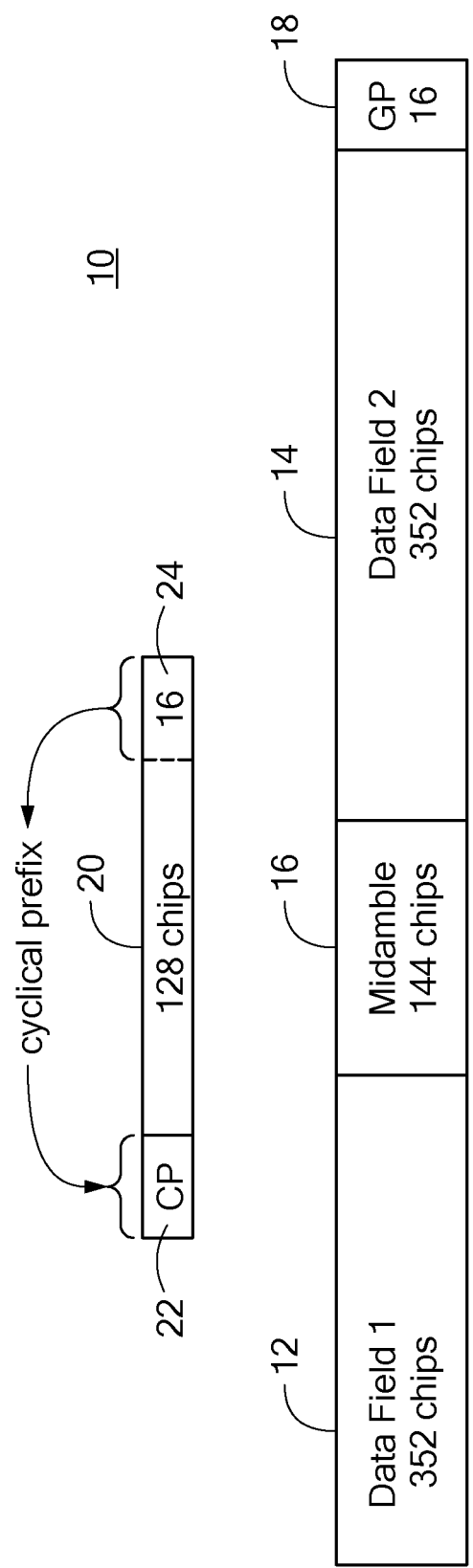
FIG. 1 is a schematic diagram of a TDSCDMA burst structure of one time slot.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Following is a disclosure of a midambled-based DC offset estimation approach and a time division synchronous code division multiple-access (TDSCDMA) system. DC offset estimation is carried out over each burst or time slot in a TDSCDMA receiver. In FIG. 1 there is shown the structure of one burst or time slot 10 consisting of four portions, two data fields 12 and 14, a midamble field 16 and a guard period 18. Each of the data fields 12 and 14 are composed of 352 chips, midamble 16, 144 chips and guard period 18, 16 chips. A chip is a symbol which has been modulated for transmission. Midamble 16 of 144 chips actually includes 128 chips, 20, of the midamble plus 16 chips of a cyclical prefix (CP) 22 which is a repetition of the last 16 chips, 24, of the midamble.

Figure 2:
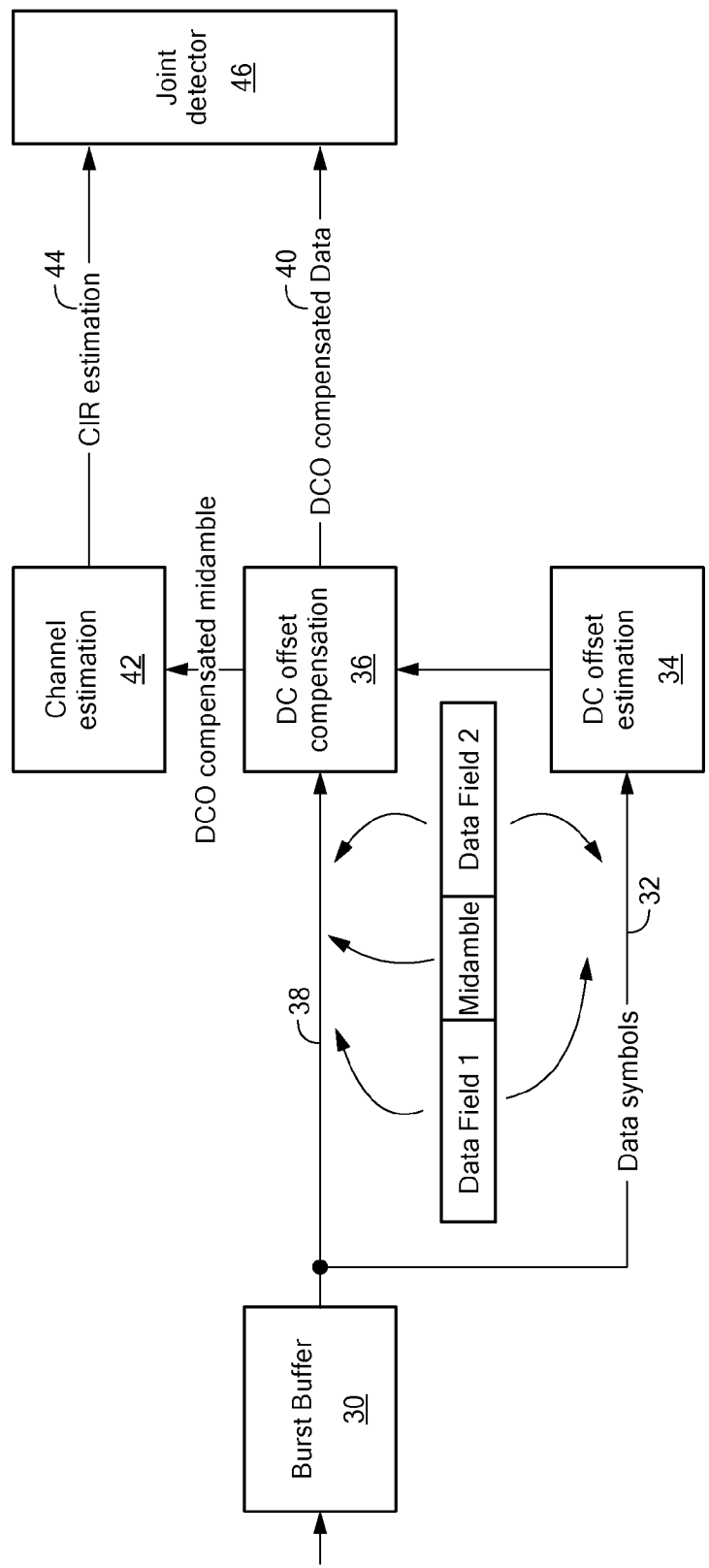
FIG. 2 is a schematic block diagram of a prior art DC offset estimation block.

One conventional DC offset estimation approach processes the data fields 12 and 14 and estimates the DC offset by averaging the data symbols or chips, FIG. 2. Burst buffer 30 receives each time slot or burst and forwards the data symbols on line 32 to DC offset estimation lock 34. The DC offset estimation is delivered to the DC offset compensation block 36. DC offset compensation block 36 receives the data on line 38 and applies the DC offset estimation from block 34 to provide the DC offset (DCO) compensated data at output 40. The DCO compensated midamble is delivered to the channel estimation block 42 which produces the channel impulse response (CIR) estimation at 44. CIR estimation 44 and DCO compensated data 40 are delivered to a joint detector 46. The expression for this DC offset estimation is $$\tilde{D} = \frac{1}{N} \sum_{i=1}^{N} r(i) \qquad (1)$$

where r(i) is the received data samples and N is the number of samples.

In accordance with this invention the DC offset estimation offset scheme processes not the data fields but the midamble to obtain the DC offset by joint estimation of DC offset and the channel impulse response (CIR). The joint estimation block may and typically is implemented with digital circuitry. It could as well be implemented in the analog to main before the ADC such as directly on the amplifier.

Figure 3:
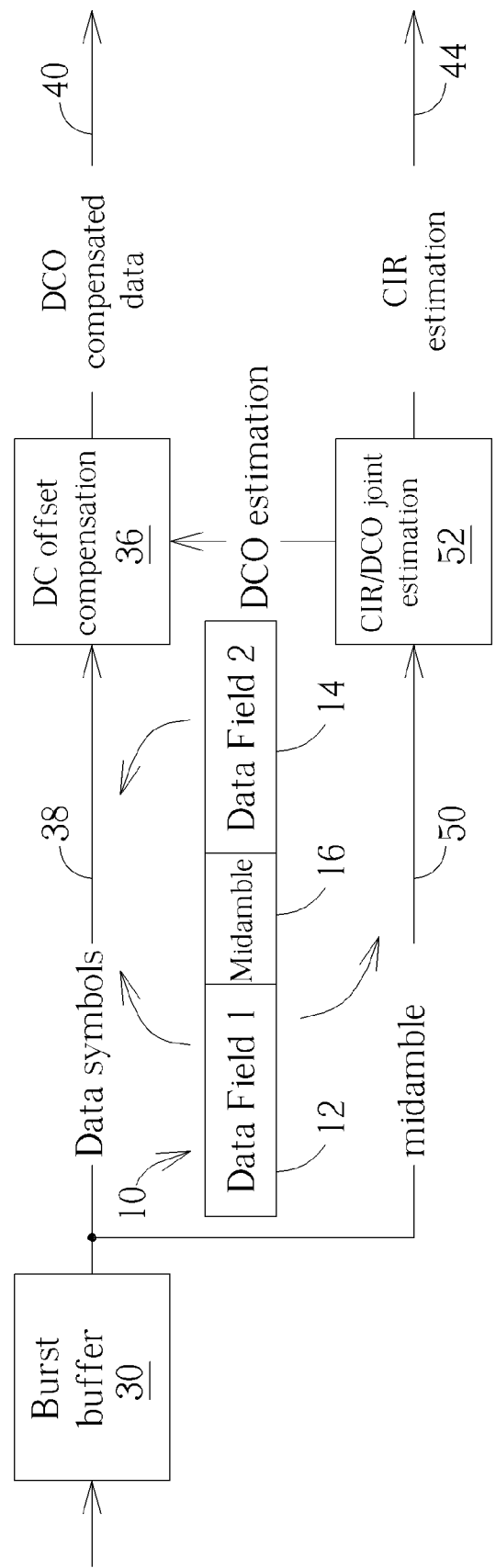
FIG. 3 is a schematic block diagram of one embodiment of an offset estimation block according to this invention.

In the approach of this invention, FIG. 3, the burst or time slot is received in burst buffer 30 as previously and data symbols 38 are passed to the DC offset compensation block 36. But it is the midamble that is passed on line 50 to a CIR/DCO joint estimation block 52 this produces the CIR estimation 44 and it also provides a DCO estimation to the DC offset compensation block 36 from which the DCO compensated data 40 is generated. CIR/DCO joint estimation block 52 includes both channel estimation and DCO estimation.

Figure 4:
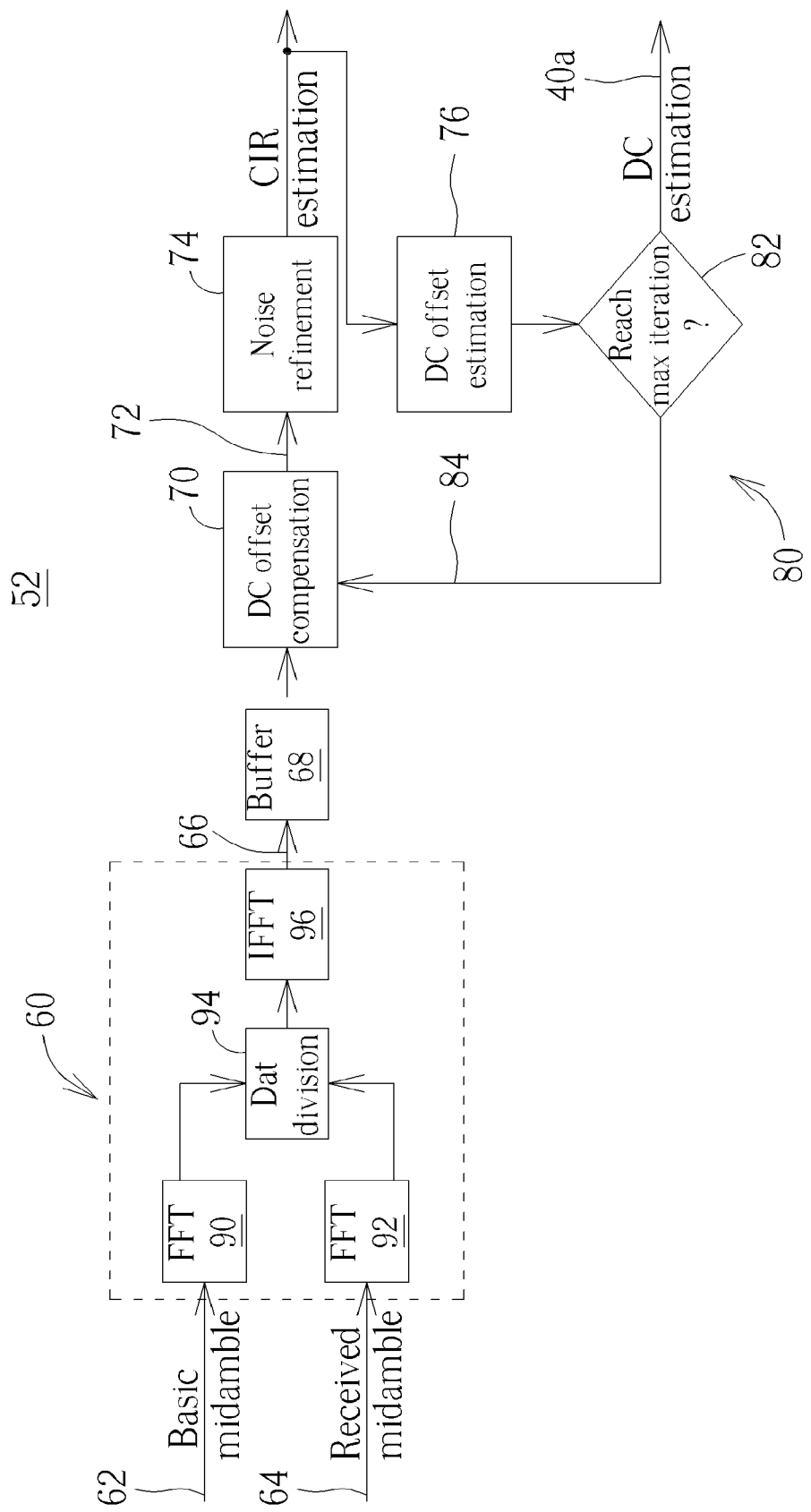
FIG. 4 is a more detailed schematic block diagram of the CIR/DCO joint estimation block of FIG. 3 with one implementation of an initial estimation CIR circuit and an iterative feedback circuit.

CIR/DCO joint estimation block 52 is shown in more detail in FIG. 4. An initial estimation CIR circuit or block 60 is responsive to a basic midamble 62 and a received midamble 64 each having a plurality of chips to provide an initial or rough estimation of the CIR as a series of taps at 66 which it delivers to storage buffer 68. A DC offset compensation block or circuit 70 is responsive to the initial or the estimated series of CIR taps at 66 stored in buffer 68 to produce a DC compensated initial or rough CIR at 72. Noise refinement circuit 74 filters out the taps of the series of CIR taps below a predetermined noise level and passes those effective taps above that level to produce the CIR estimation at 44a. The DC offset estimation block or circuit 76 responds to the CIR estimation at 44a to provide a DC offset estimation 40a. In a preferred embodiment a recursive feedback loop 80 including an iteration counter 82 and feedback line 84 provides a recursive operation. Typically only one or two iterations are required to converge the system to an accurate CIR estimation and DC estimation.

Initial estimation CIR circuit or block 60 as well as noise refinement circuit block 74 are known to be used in conventional systems. It is the addition of buffer 68, DC offset compensation block 70, DC offset estimation block 76 and in a preferred embodiment the iterative counter 82 and feedback line 84 that implement an embodiment of this invention. Initial estimation CIR block 60 may take a number of different forms or configurations. In this particular example it is shown as having two fast Fourier transform circuits (FFT) 90 and 92, a dot division circuit 94 and an inverse FFT (IFFT) 96. FFT 90 transforms the basic midamble 62 while FFT 92 transforms the received midamble 64. Dot division circuit 94 divides the FFT of the received midamble by the FFT of the basic midamble one chip or symbol at a time. These are then inversely transformed by IFFT 96 to provide the series or sequence of taps provided at 66 to buffer 68. The basic midamble is a copy of the original midamble before it was sent by the TDSCDMA transmitter; the received midamble is the one received by the TDSCDMA receiver after the propagation channel and stored by the input burst buffer 30. The CIR/DC joint estimation block 52, FIG. 4, including initial estimation CIR circuit or block 60 and noise refinement circuit or block 74 can be implemented in hardware by a computer or processor configured to perform the functions of the components shown in FIG. 4.

The CIR/DCO joint estimation block in accordance with this invention preferably runs in an iterative manner. The CIR estimation is calculated by de-convolving the received midamble from the basic transmitted midamble in the frequency domain. Then the DC offset is calculated after noise refinement on the CIR estimation. The DC offset is fed back to the CIR estimation block to remove the residual DC offset component. The DCO compensated CIR estimation can be used then to get a more accurate DC offset estimation. After one or more iterations, both CIR estimation and DCO estimation will converge.

Figure 5:
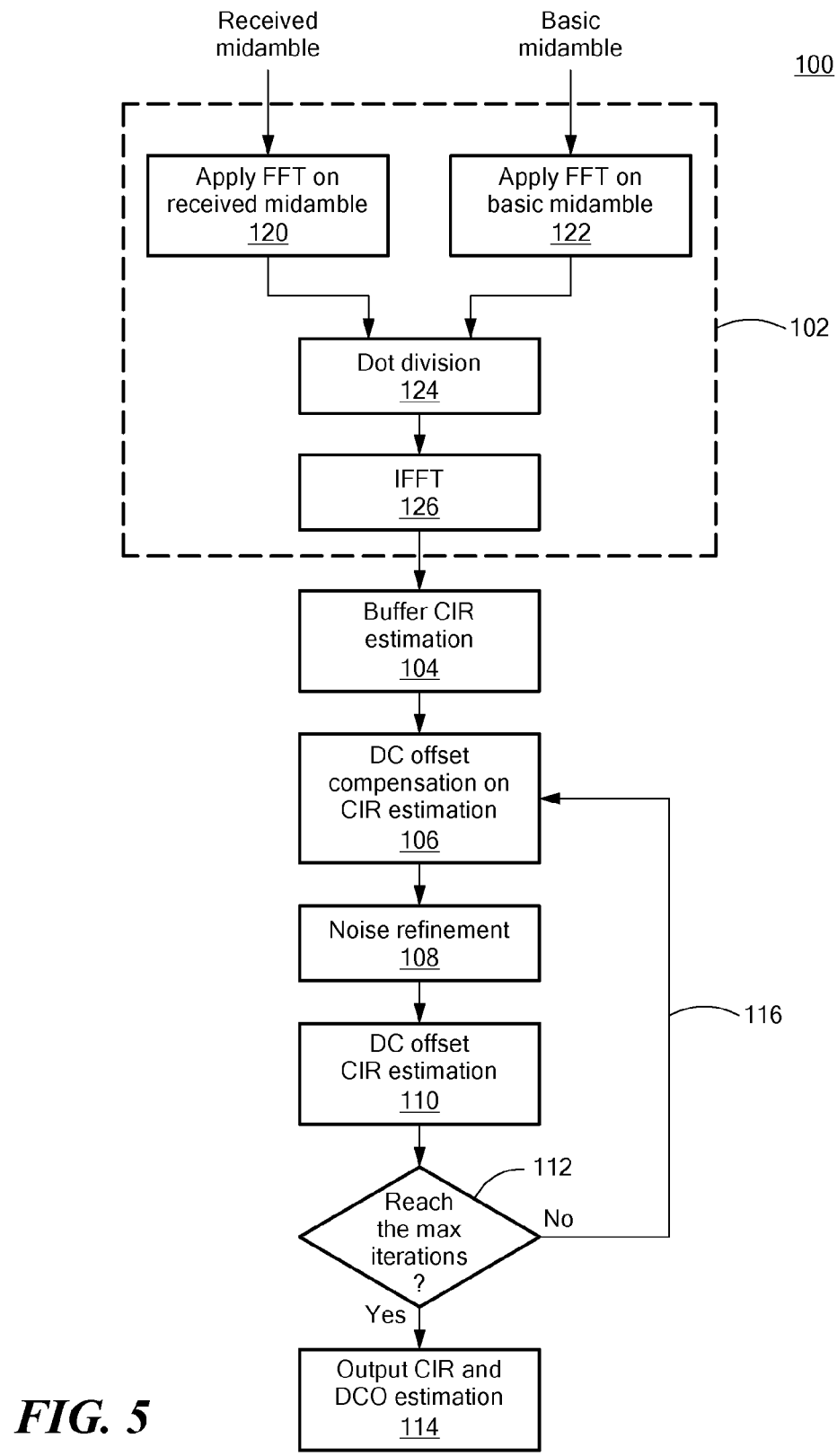
FIG. 5 is a flow chart of one embodiment of the method of this invention.

One embodiment of the method of this invention is shown in FIG. 5. An initial or rough estimation of the CIR as the series of taps is generated from a basic midamble and received midamble in step 102. The initial or rough estimate CIR taps are stored in a buffer step 104. The DC compensated CIR is calculated from the initially established CIR taps, step 106, and then a noise refinement 108 filters out noise from the compensated CIR by suppressing taps below a predetermined threshold such as noise power times an experimental factor and passing those above it to provide the effective taps. In step 110 the DC offset estimation is calculated from the CIR estimation. If the maximum number of iterations have been reached, step 112, then the final CIR and DCO estimations are output at 114. If the final iteration has not been reached, the system loops back line 116 to begin again at step 106. Step 102 may be implemented in a number of ways without limiting the invention. One such way appears in FIG. 5, where the received midamble has a fast Fourier transform (FFT) applied to it 120 as does the basic midamble 122. Dot division 124 is then performed whereby the received midamble is divided by the basic midamble chip by chip. The result is passed through an inverse fast Fourier transform operation (IFFT) 126 to produce the initial estimation of the CIR as the series of taps.

The received midamble is the linear convolution of the basic midamble and the CIR. By removing the cyclical prefix, the linear convolution turns into a cyclical convolution, which is equivalent to multiplication in the frequency domain. CIR estimation can then be achieved by de-convolution in the frequency domain. This de-convolution is carried out in the initial estimation of the CIR as follows:

Apply FFT to received midamble:

$$\underline{R}_{mid} = \text{FFT}(\underline{r}_{mid}) \quad (2)$$

Also apply FFT to basic midamble $$\underline{M} = \text{FFT}(\underline{m}) \quad (3)$$

The basic midamble sequence can be obtained from a higher-layer notice.

Dot division is accomplished:

$$\tilde{H}(i) = \underline{R}_{mid}(i)/M(i) \quad (4)$$

An inverse fast Fourier transform (IFFT) is performed:

$$\tilde{h} = \text{IFFT}(\tilde{H}) \quad (5)$$

The temporary CIR estimation, $\tilde{h}$ is saved in a buffer.

The DC offset compensation on CIR estimation is carried out as follows:

$$\overline{h}^{(k)}(j) = \tilde{h}(j) - \frac{\hat{D}^{(k)}}{\sum m(i)} \quad (6)$$

Where k is the iteration index, starting from 0. $\hat{D}^{(k)}$ is the DCO estimation at $k^{th}$ iteration. The initial DCO offset estimation, $\hat{D}^{(0)}$ is a rough guess. For example, we can use the average of received midamble, $$\hat{D}^{(0)} = \frac{1}{128} \sum_i r_{mid}(i).$$

We do not need to calculate this average separately, since it was already obtained in equation (2)

$$\sum_i r_{mid}(i) = R_{mid}(0).$$

Similarly, $\Sigma m(i)$ was also obtained in equation (2):

$$\sum_i m(i) = M(0)$$

This is followed by noise refinement as a non-linear processing:

$$\hat{h}^{(k)} = \text{refine}(\overline{h}^{(k)}) \quad (7)$$

$$\hat{h}^{(k)}(i) = \begin{cases} \overline{h}^{(k)}(i), & \text{if } |\overline{h}^{(k)}(i)| \text{ is larger than predetermined threshold} \\ 0. \end{cases}$$

Then the DC offset estimation is updated by $$\hat{D}^{(k+1)} = \frac{1}{128}\sum_{i}^{128} r_{mid}(i) - \frac{\sum_{i=0}^{128} \hat{h}^{(k)}(i)\sum_{i=0}^{128} m(i)}{128}. \quad (8)$$

The intermediate result can be reused for $$\sum_{i} r_{mid}(i) \text{ and } \sum_{i} m(i). \quad (9)$$

With the iteration counting if the maximum number of iterations has been reached the system can go on otherwise it will go back to equation (6) with the updated iteration index. Then the final output CIR and DCO estimations can be output $$\hat{h}^{(k)} \text{ and } \hat{D}^{(k+1)} \quad (10)$$

As indicated previously this recursive enhancement doesn't require many iterations, normally one or two would be sufficient. The extra blocks or processes employed by this invention add a number of extra computations but they are limited primarily only to additions and multiplications and do not significantly add to the complexity of the system without matrix manipulations or similar complex operations.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A channel impulse response (CIR)/DC offset (DCO) joint estimation block comprising:
   an estimation CIR circuit responsive to a basic and a received midamble, each having a plurality of chips to provide an initial estimation of the CIR as a series of CIR taps;
   a DC offset compensation circuit responsive to said estimated series of CIR taps to produce a DC compensated CIR;
   a noise refinement circuit receiving said DC compensated CIR, filtering out the taps of a series of CIR taps below a predetermined noise level and passing a CIR estimation; and
   a DC offset estimation circuit responsive to said CIR estimation to provide a DC offset estimation.

2. The CIR/DCO joint estimation block of claim 1, further comprising an iterative feedback circuit connected from said DC offset estimation circuit to said DC offset compensation circuit for updating the compensation of said DC compensated CIR and improving the accuracy of said CIR estimation and said DC offset estimation.

3. The CIR/DOC joint estimation block of claim 1, wherein said estimation CIR circuit is adapted for use in time division synchronous code division multiple access (TDSCDMA) receiver and comprises a fast Fourier transform (FFT) circuit responsive to each of said midambles, a dot division circuit responsive to said FFT circuit outputs to divide said received midamble by said basic midamble to provide chip by chip and an inverse FFT responsive to said dot division circuit to provide to a buffer said initial estimation of said CIR as a series of CIR taps.

4. The CIR/DCO joint estimation block of claim 1, which is implemented in digital circuitry.

5. A channel impulse response (CIR)/DC offset (DCO) joint estimation block comprising:
   a processor configured to:
      generate from a basic midamble and received midamble an initial estimation of the CIR as a series of CIR taps;
      calculate a DC compensated CIR from the estimated CIR taps;
      filter out the noise from the said DC compensated CIR to produce a CIR estimation; and
      calculate a DC offset estimation from the CIR estimation.

6. The CIR/DCO joint estimation block of claim 5, wherein said processor is further configured to apply said DC offset estimation to said calculation of said DC compensated CIR to improve the accuracy of said CIR estimation and said DC offset estimation.

7. The CIR/DCO joint estimation block of claim 5, wherein each said midamble includes a plurality of chips and said processor is adapted for use in a TDSCDMA receiver and is further configured to generate from the basic and received midamble an estimation of the CIR as a series of CIR taps by performing a fast Fourier transfer (FFT) of each midamble, dot dividing the received midamble by the basic midamble chip by chip and performing an inverse FFT of the result to provide said initial estimation of said CIR as a series of CIR taps.

8. The CIR/DCO joint estimation block of claim 5, which is implemented in digital circuitry.

9. A method of channel impulse response (CIR)/DC offset (DCO) joint estimation for a time division synchronous code division multiple access (TDSCDMA) system, the method comprising:
   (a) generating from a basic midamble and a received midamble an initial estimation of the CIR as a series of CIR taps;
   (b) storing the initially estimated CIR taps;
   (c) calculating a DC compensated CIR from the initially estimated CIR taps;
   (d) filtering out the noise from the said DC compensated CIR to produce a CIR estimation; and
   (e) calculating a DC offset estimation from the CIR estimation.

10. The method of CIR/DCO joint estimation of claim 9, further comprising iterative feeding back said DC offset estimation to the step (c) for calculating said DC compensated CIR to improve the accuracy of said CIR estimation and said DC offset estimation.

11. The method of CIR/DCO joint estimation of claim 9, wherein each midamble includes a plurality of chips, and the step (a) comprises:
  performing a fast Fourier transfer (FFT) of each midamble;
  dot dividing the received midamble by the basic midamble chip by chip; and
  performing an inverse FFT of the result to provide said initial estimation of said CIR as a series of CIR taps.

12. The method of CIR/DCO joint estimation of claim 9, wherein the step (a) comprises:
  calculating $\underline{R}_{mid}$=FFT ($\underline{r}_{mid}$), $\underline{M}$=FFT(m), $\tilde{H}(i)=R_{mid}(i)/M(i)$, $\tilde{h}$=IFFT($\tilde{H}$).

13. The method of CIR/DCO joint estimation of claim 9, wherein a stored initial CIR estimation $\tilde{h}$ is applied to calculate the DC compensated CIR from the initially estimated CIR taps according to $$\overline{h}^{(k)}(j) = \tilde{h}(j) - \frac{\hat{D}^{(k)}}{\sum m(i)};$$

where k is an iteration index, starting from 0; $\hat{D}^{(k)}$ is a DCO estimation at $k^{th}$ iteration; an initial value of DC estimation, $\hat{D}^{(0)}$, is $$\frac{1}{128} R_{mid}(0)$$

and $\Sigma m(i)=M(0)$.

14. The method of CIR/DCO joint estimation of claim 9, wherein the noise is filtered out from the compensated CIR to produce the CIR estimation according to:

$$\hat{h}^{(k)} = \text{refine}(\overline{h}^{(k)})$$
$$\hat{h}^{(k)}(i) = \begin{cases} \overline{h}^{(k)}(i), & \text{if } |\overline{h}^{(k)}(i)| \text{ is larger than predetermined threshold} \\ 0. \end{cases}$$

15. The method of CIR/DCO joint estimation of claim 9, wherein the DC offset estimation is calculated from the CIR estimation according to:

$$\hat{D}^{(k+1)} = \frac{1}{128} \sum_{i}^{128} r_{mid}(i) - \frac{\sum_{i=0}^{128} \hat{h}^{(k)}(i) \sum_{i=0}^{128} m(i)}{128}.$$

16. A TDSCDMA receiver including a channel impulse response (CIR)/DC offset (DCO) joint estimation block comprising:
  an interface to collect midamble $r_{mid}$;
  an initial estimation CIR circuit responsive to a basic midamble $r_{mid}$ and a received midamble m, each having a plurality of chips to provide an initial estimation of the CIR as a series of CIR taps $\tilde{h}$;
  a buffer for storing said initially estimated series of CIR taps $\tilde{h}$;
  a DC offset compensation circuit responsive to said initially estimated series of CIR taps to produce a DC compensated CIR $\overline{h}(i)$;
  a noise refinement circuit receiving said DC compensated CIR $\overline{h}(i)$ for filtering out the taps of a series of CIR taps below a predetermined noise level and passing a CIR estimation $\hat{h}$; and
  a DC offset estimation circuit responsive to said CIR estimation to provide a DC offset estimation $\hat{D}$.

17. The TDSCDMA receiver of claim 16 further comprising an iterative feedback circuit connected from said DC offset estimation circuit to said DC offset compensation circuit for updating the compensation of said DC compensated CIR and improving the accuracy of said CIR estimation and said DC offset estimation.

18. The TDSCDMA receiver of claim 16, wherein said CIR/DCO joint estimation circuit generates an initial estimation of the CIR including calculating $\underline{R}_{mid}$=FFT($\underline{r}_{mid}$), $\underline{M}$=FFT(m), $\tilde{H}(i)=R_{mid}(i)/M(i)$, $\tilde{h}$=IFFT($\tilde{H}$).

19. The TDSCDMA receiver of claim 16, wherein a stored initial CIR estimation $\tilde{h}$ is applied to calculate the DC compensated CIR from the initially estimated CIR taps according to $$\overline{h}^{(k)}(j) = \tilde{h}(j) - \frac{\hat{D}^{(k)}}{\sum m(i)};$$

where k is an iteration index, starting from 0; $\hat{D}^{(k)}$ is a DCO estimation at $k^{th}$ iteration; an initial value of DC estimation, $\hat{D}^{(0)}$, is $$\frac{1}{128} R_{mid}(0)$$

and $\Sigma m(i)=M(0)$.

20. The TDSCDMA receiver of claim 16, wherein the noise is filtered out from the compensated CIR to produce the CIR estimation according to:

$$\hat{h}^{(k)} = \text{refine}(\overline{h}^{(k)})$$
$$\hat{h}^{(k)}(i) = \begin{cases} \overline{h}^{(k)}(i), & \text{if } |\overline{h}^{(k)}(i)| \text{ is larger than predetermined threshold} \\ 0. \end{cases}$$

21. The TDSCDMA receiver of claim 16, wherein the DC offset estimation is calculated from the CIR estimation according to:

$$\hat{D}^{(k+1)} = \frac{1}{128} \sum_{i}^{128} r_{mid}(i) - \frac{\sum_{i=0}^{128} \hat{h}^{(k)}(i) \sum_{i=0}^{128} m(i)}{128}.$$

22. A time division synchronous code division multiple access (TDSCDMA) receiver comprising a channel impulse response (CIR)/DC offset (DCO) joint estimation block comprising:
  a processor configured to:
    generate from a basic midamble and a received midamble an initial estimation of the CIR as a series of CIR taps;
    store the initially estimated CIR taps;

calculate a DC compensated CIR from the initially estimated CIR taps;

filter out the noise from the said DC compensated CIR to produce a CIR estimation; and calculate a DC offset estimation from the CIR estimation; and an iterative feedback loop connected from a DC offset estimation circuit to a DC offset compensation circuit for updating the compensation of said compensated CIR and improving the accuracy of said CIR estimation and said DC offset estimation.

23. The TDSCDMA receiver of claim 22, wherein generating an initial estimation of the CIR comprises calculating $\underline{R}_{mid}=FFT(\underline{r}_{mid})$, $\underline{M}=FFT(\underline{m})$, $\tilde{H}(i)=R_{mid}(i)/M(i)$, $\tilde{h}=IFFT(\tilde{H})$.

24. The TDSCDMA receiver of claim 22, wherein a stored initial CIR estimation $\tilde{h}$ is applied to calculate the DC compensated CIR from the initially estimated CIR taps according to $$\bar{h}^{(k)}(j) = \tilde{h}(j) - \frac{\hat{D}^{(k)}}{\sum m(i)};$$

where k is an iteration index, starting from 0; $\hat{D}^{(k)}$ is a DCO estimation at $k^{th}$ iteration; an initial value of DC estimation, $\hat{D}^{(0)}$, is $$\frac{1}{128}R_{mid}(0)$$

and $\Sigma m(i)=M(0)$.

25. The TDSCDMA receiver of claim 22, wherein the noise is filtered out from the DC compensated CIR to produce the CIR estimation according to:

$$\hat{\underline{h}}^{(k)} = \text{refine}(\bar{\underline{h}}^{(k)})$$

$$\hat{h}^{(k)}(i) = \begin{cases} \bar{h}^{(k)}(i), & \text{if } |\bar{h}^{(k)}(i)| \text{ is larger than predetermined threshold} \\ 0. \end{cases}$$

26. The TDSCDMA receiver of claim 22, wherein the DC offset estimation is calculated from the CIR estimation according to:

$$\hat{D}^{(k+1)} = \frac{1}{128}\sum_{i}^{128} r_{mid}(i) - \frac{\sum_{i=0}^{128}\hat{h}^{(k)}(i)\sum_{i=0}^{128}m(i)}{128}.$$

* * * * *